(12) United States Patent
Wang et al.

(10) Patent No.: US 12,204,191 B2
(45) Date of Patent: Jan. 21, 2025

(54) LIQUID-CRYSTAL DISPLAY PANEL, DISPLAYING MODULE AND ELECTRONIC DEVICE

(71) Applicants: CHONGQING BOE OPTOELECTRONICS TECHNOLOGY CO., LTD., Chongqing (CN); BOE TECHNOLOGY GROUP CO., LTD., Beijing (CN)

(72) Inventors: Jingyu Wang, Beijing (CN); Zhe Li, Beijing (CN); Zhidan Sun, Beijing (CN); Ruiqi Pan, Beijing (CN); Dan Lei, Beijing (CN); Zhengyuan Teng, Beijing (CN); Peng Li, Beijing (CN); Xiaoji Li, Beijing (CN); Taeyup Min, Beijing (CN); Hailin Qin, Beijing (CN)

(73) Assignees: CHONGQING BOE OPTOELECTRONICS TECHNOLOGY CO., LTD., Chongqing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/925,694

(22) PCT Filed: Dec. 17, 2021

(86) PCT No.: PCT/CN2021/139268
§ 371 (c)(1),
(2) Date: Nov. 16, 2022

(87) PCT Pub. No.: WO2023/108636
PCT Pub. Date: Jun. 22, 2023

(65) Prior Publication Data
US 2024/0241400 A1    Jul. 18, 2024

(51) Int. Cl.
G02F 1/1333     (2006.01)
G02F 1/1335     (2006.01)
G02F 1/13357    (2006.01)

(52) U.S. Cl.
CPC .... *G02F 1/13338* (2013.01); *G02F 1/133512* (2013.01); *G02F 1/133603* (2013.01); *G02F 1/133607* (2021.01); *G02F 2201/52* (2013.01)

(58) Field of Classification Search
CPC .......... G02F 1/13338; G02F 1/133603; G02F 1/133607; G02F 2201/52
(Continued)

(56) References Cited

U.S. PATENT DOCUMENTS

2006/0239031 A1    10/2006 Lin et al.
2008/0030662 A1*   2/2008 Igeta .................. G02F 1/1362
                                              349/114
(Continued)

FOREIGN PATENT DOCUMENTS

CN    104330935 A    2/2015
CN    104407480 A    3/2015
(Continued)

*Primary Examiner* — Charles S Chang
(74) *Attorney, Agent, or Firm* — WHDA, LLP (57) ABSTRACT

A liquid-crystal display panel includes a first region and a second region, and a transmittance of the first region is greater than a transmittance of the second region; the liquid-crystal display panel includes a plurality of sub-pixels; the plurality of sub-pixels include a first-color sub-pixel and a second-color sub-pixel, a transmittance of the first-color sub-pixel is greater than a transmittance of the second-color sub-pixel, and an area of the first-color sub-pixel is greater than an area of the second-color sub-pixel; and the plurality of sub-pixels further include a first-region sub-pixel and a second-region sub-pixel that have a same color, the first-region sub-pixel is located within the first region, the second-region sub-pixel is located within the (Continued)

second region, and a thickness of a color-resistance layer of the first-region sub-pixel is less than or equal to a thickness of a color-resistance layer of the second-region sub-pixel.

15 Claims, 6 Drawing Sheets

(58) Field of Classification Search
USPC .................. 349/106–109, 142–148, 139–144
See application file for complete search history.

(56) References Cited

U.S. PATENT DOCUMENTS

| | | | |
|---|---|---|---|
| 2016/0103547 A1 | 4/2016 | Lu et al. | |
| 2016/0342042 A1 | 11/2016 | Yu et al. | |

FOREIGN PATENT DOCUMENTS

| | | | |
|---|---|---|---|
| CN | 205139519 U | 4/2016 | |
| CN | 113109965 A | 7/2021 | |
| CN | 113238408 A | 8/2021 | |

* cited by examiner

LIQUID-CRYSTAL DISPLAY PANEL, DISPLAYING MODULE AND ELECTRONIC DEVICE

TECHNICAL FIELD

The present disclosure relates to the technical field of displaying, and particularly relates to a liquid-crystal display panel, a displaying module and an electronic device.

BACKGROUND

Liquid-crystal display panels, as a type of extensively used flat display panels, are very important in the field of displaying. Additionally, an under-screen camera refers to placing a front-facing camera completely under the screen, which can increase the screen-to-body ratio.

SUMMARY

The present disclosure provides a liquid-crystal display panel, wherein the liquid-crystal display panel includes a first region and a second region, and a transmittance of the first region is greater than a transmittance of the second region;

the liquid-crystal display panel includes a plurality of sub-pixels;

the plurality of sub-pixels include a first-color sub-pixel and a second-color sub-pixel, a transmittance of the first-color sub-pixel is greater than a transmittance of the second-color sub-pixel, and an area of the first-color sub-pixel is greater than an area of the second-color sub-pixel; and the plurality of sub-pixels further include a first-region sub-pixel and a second-region sub-pixel that have a same color, the first-region sub-pixel is located within the first region, the second-region sub-pixel is located within the second region, and a thickness of a color-resistance layer of the first-region sub-pixel is less than or equal to a thickness of a color-resistance layer of the second-region sub-pixel.

In an alternative implementation, an emitted-light color of the first-color sub-pixel is green, and an emitted-light color of the second-color sub-pixel is red or blue.

In an alternative implementation, the plurality of sub-pixels further include a third-color sub-pixel, a transmittance of the third-color sub-pixel is greater than the transmittance of the second-color sub-pixel, and less than the transmittance of the first-color sub-pixel, and an area of the third-color sub-pixel is greater than or equal to the area of the second-color sub-pixel, and less than or equal to the area of the first-color sub-pixel.

In an alternative implementation, an emitted-light color of the first-color sub-pixel is green, an emitted-light color of the second-color sub-pixel is blue, and an emitted-light color of the third-color sub-pixel is red.

In an alternative implementation, the liquid-crystal display panel includes an array base plate and a cell substrate that face each other, and the array base plate includes a first substrate, and a first electrode layer, an insulating layer and a second electrode layer that are provided in stack on one side of the first substrate that is close to the cell substrate;

the first electrode layer includes a touch-controlling electrode and a pixel electrode that are separately provided, the second electrode layer includes a common electrode, and the touch-controlling electrode and the common electrode are connected to a same voltage outputting terminal; and an orthographic projection of the second electrode layer on the first substrate and an orthographic projection of the touch-controlling electrode on the first substrate do not overlap, and the orthographic projection of the second electrode layer on the first substrate and an orthographic projection on the first substrate of a separating region between the touch-controlling electrode and the pixel electrode do not overlap.

In an alternative implementation, the liquid-crystal display panel includes an array base plate and a cell substrate that face each other, an isolating pillar is provided between the array base plate and the cell substrate, and in a direction from the array base plate pointing to the cell substrate, the isolating pillar is provided with a first surface and a second surface that are opposite; and edges of the first surface protrude relatively to edges of an orthographic projection of the second surface on the first surface, and a protruding amount is less than or equal to 3 μm.

In an alternative implementation, the liquid-crystal display panel further includes a light shielding layer, the light shielding layer is provided on the array base plate and/or the cell substrate, edges of an orthographic projection of the light shielding layer on a plane where the first surface is located protrude relatively to the edges of the first surface, and a protruding amount is greater than or equal to 2 μm, and less than or equal to 10 μm.

The present disclosure provides a displaying module, wherein the displaying module includes a backlight module and the liquid-crystal display panel according to any one of the above embodiments, the backlight module is provided away from a light exiting side of the liquid-crystal display panel, and the backlight module is for providing a backlight to the liquid-crystal display panel; and the backlight module is provided with an opening region, an orthographic projection of the opening region on the display panel is located within the first region, the opening region is for placing a photographing module, and the photographing module is for photographing an image.

In an alternative implementation, the backlight module includes a first light source, and the first light source is a light emitting diode using a red-green-color phosphor powder.

In an alternative implementation, the backlight module includes a light guide plate and at least one prismatic lens, and the at least one prismatic lens is located on a light exiting side of the light guide plate; and the prismatic lens includes a base film, and a plurality of prism components provided on one side of the base film that is away from the light guide plate, the plurality of prism components include at least one first prism component and at least one second prism component, the at least one second prism component is located between the at least one first prism component and the opening region, the first prism component is for exiting light rays entering the first prism component toward the second region, and the second prism component is for exiting at least part of light rays entering the second prism component toward the first region.

In an alternative implementation, each of the prism components is provided with a bevel close to the opening region, and an included angle between the bevel and the base film is an angle of gradient; and an angle of gradient of a second prism component away from the opening region is greater than an angle of gradient of a second prism component close to the opening region, and less than an angle of gradient of the first prism component.

In an alternative implementation, angles of gradient of all of the first prism components are equal.

In an alternative implementation, the angles of gradient of the first prism components are 45°.

In an alternative implementation, the backlight module further includes a second light source, and the second light source is located at an end face of one side of the light guide plate that is close to the opening region.

In an alternative implementation, the second light source is a light emitting diode using a red-green-color phosphor powder.

The present disclosure provides an electronic device, wherein the electronic device includes a photographing module and the displaying module according to any one of the above embodiments, and the photographing module is located within the opening region of the backlight module.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the related art, the figures that are required to describe the embodiments or the related art will be briefly described below. Apparently, the figures that are described below are embodiments of the present disclosure, and a person skilled in the art can obtain other figures according to these figures without paying creative work. It should be noted that the proportions in the drawings are merely illustrative and do not indicate the actual proportions.

DETAILED DESCRIPTION

In order to make the objects, the technical solutions and the advantages of the embodiments of the present disclosure clearer, the technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

In the related art, the transmittances of liquid-crystal display panels are generally approximately 6%, which cannot satisfy the requirement on the transmittance greater than or equal to 15% for the provision of an under-screen camera. Therefore, in order to enable the provision of an under-screen camera, it is required to increase the transmittances of liquid-crystal display panels.

Figure 1:
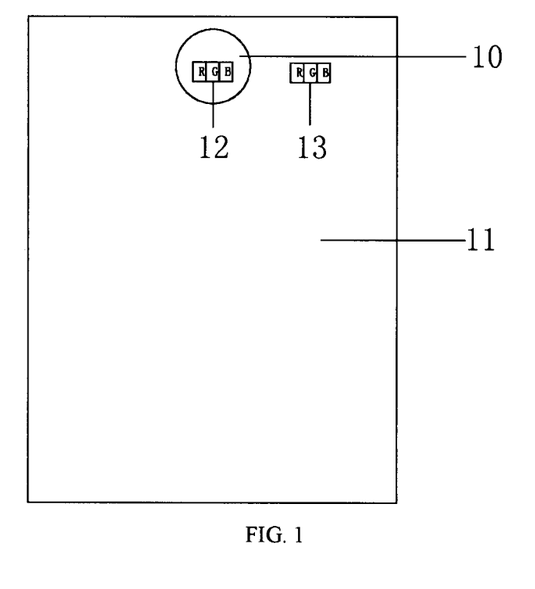
FIG. 1 schematically shows a schematic planar structural diagram of a liquid-crystal display panel.

An embodiment of the present disclosure provides a liquid-crystal display panel. Referring to FIG. 1, the liquid-crystal display panel includes a first region 10 and a second region 11, and the transmittance of the first region 10 is greater than the transmittance of the second region 11.

Particularly, the first region 10 may be the region of an under-screen camera, and the second region 11 may be a regular displaying region.

The second region 11 may, for example, encircle the first region 10, as shown in FIG. 1, which is not limited in the present disclosure.

Figure 2:
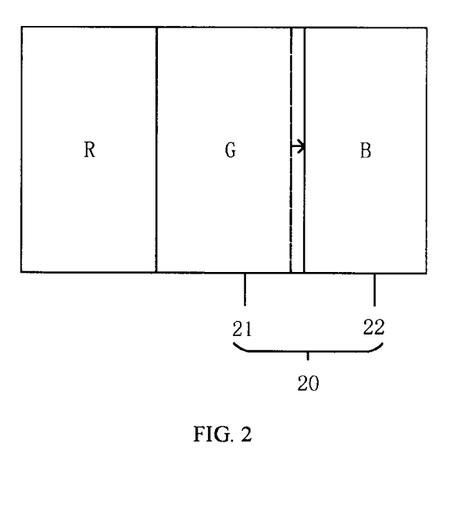
FIG. 2 schematically shows a schematic structural diagram of the sub-pixels in a liquid-crystal display panel.

Referring to FIG. 2, the liquid-crystal display panel includes a plurality of sub-pixels 20. The plurality of sub-pixels 20 may, for example, be arranged in an array in the liquid-crystal display panel.

In the present embodiment, the plurality of sub-pixels 20 include a first-color sub-pixel 21 and a second-color sub-pixel 22, the transmittance of the first-color sub-pixel 21 is greater than the transmittance of the second-color sub-pixel 22, and the area of the first-color sub-pixel 21 is greater than the area of the second-color sub-pixel 22.

The emitted-light colors of the first-color sub-pixel 21 and the second-color sub-pixel 22 are different. The emitted-light color of the first-color sub-pixel 21 may be a color such as red, green and blue. The emitted-light color of the second-color sub-pixel 22 may be a color such as red, green and blue.

By configuring the first-color sub-pixel 21 and the second-color sub-pixel 22 of the different emitted-light colors to have different areas, to cause the area of the first-color sub-pixel 21 of a higher transmittance to be greater than the area of the second-color sub-pixel 22 of a lower transmittance, as compared with the case in which the areas of the first-color sub-pixel 21 and the second-color sub-pixel 22 are equal, the transmittance of the liquid-crystal display panel may be increased.

As shown in FIG. 1, the plurality of sub-pixels 20 further include a first-region sub-pixel 12 and a second-region sub-pixel 13 that have the same color, the first-region sub-pixel 12 is located within the first region 10, the second-region sub-pixel 13 is located within the second region 11, and the thickness of the color-resistance layer of the first-region sub-pixel 12 is less than or equal to the thickness of the color-resistance layer of the second-region sub-pixel 13.

The emitted-light colors of the first-region sub-pixel 12 and the second-region sub-pixel 13 are the same. Both of the emitted-light colors of the first-region sub-pixel 12 and the second-region sub-pixel 13 may be a color such as red, green and blue, which is not limited in the present disclosure.

In a particular implementation, a halftone mask may be used to perform exposure and development to the color-resistance layer, to, by controlling the exposure amount, realize the color-resistance layer of a lower thickness in the first region 10 as compared with the second region 11.

Regarding the first-region sub-pixel 12 and the second-region sub-pixel 13 of the same emitted-light color, the thickness of the color-resistance layer of the first-region sub-pixel 12 located within the first region 10 is less than or equal to the thickness of the color-resistance layer of the second-region sub-pixel 13 located within the second region 11, and by providing the color-resistance layer of the lower thickness in the sub-pixels 20 within the first region 10, the transmittance of the first region 10 may be increased, to improve the imaging quality of the under-screen camera.

In a particular implementation, the first-color sub-pixel 21 and the second-color sub-pixel 22 may have multiple modes of color combination.

In an alternative implementation, as shown in FIG. 2, the emitted-light color of the first-color sub-pixel 21 is green, and the emitted-light color of the second-color sub-pixel 22 is blue. In other words, the first-color sub-pixel 21 is a green-color sub-pixel G, and the second-color sub-pixel 22 is a blue-color sub-pixel B.

The pixel unit shown in FIG. 2 is formed by a green-color sub-pixel G, a blue-color sub-pixel B and a red-color sub-pixel R. The dotted line in FIG. 2 is the boundary line when the area ratio of the red-color sub-pixel R, the green-color sub-pixel G and the blue-color sub-pixel B is 1:1:1.

In the pixel unit formed by the green-color sub-pixel G, the blue-color sub-pixel B and the red-color sub-pixel R, the transmittance of a green-color color resistance is the highest, and is generally approximately 60%, and the transmittance of a blue-color color resistance is the lowest, which is generally approximately 10%. Therefore, based on the area ratio of 1:1:1, by increasing the area of the green-color sub-pixel G, and reducing the area of the blue-color sub-pixel B, the area of the green-color sub-pixel G is greater than the area of the blue-color sub-pixel B, which may effectively increase the transmittance of light rays.

When the ratio of the area of the green-color sub-pixel G to the area of the blue-color sub-pixel B is 1.1:0.9, the transmittance of the liquid-crystal display panel may be increased by 3%-5%.

While the total area of the pixel unit is constant, because the transmittance of a green-color color resistance is the highest, and the transmittance of a blue-color color resistance is the lowest, when the emitted-light color of the first-color sub-pixel 21 is green, and the emitted-light color of the second-color sub-pixel 22 is blue, the transmittance of light rays may be increased to the utmost extent.

In another alternative implementation, the emitted-light color of the first-color sub-pixel 21 is green, and the emitted-light color of the second-color sub-pixel 22 is red. In other words, the first-color sub-pixel 21 is a green-color sub-pixel G, and the second-color sub-pixel 22 is a red-color sub-pixel R.

In the pixel unit formed by the green-color sub-pixel G, the blue-color sub-pixel B and the red-color sub-pixel R, the transmittance of a green-color color resistance is the highest, and is generally approximately 60%, and the transmittance of a red-color color resistance is lower, which is generally approximately 30%. Therefore, based on the area ratio of 1:1:1, by increasing the area of the green-color sub-pixel G, and reducing the area of the red-color sub-pixel R, the area of the green-color sub-pixel G is greater than the area of the red-color sub-pixel R, which can also effectively increase the transmittance of light rays.

In a particular implementation, the first-color sub-pixel 21 may also be a red-color sub-pixel R, and the second-color sub-pixel 22 is a blue-color sub-pixel B. Because the transmittance of a red-color color resistance is greater than the transmittance of a blue-color color resistance, by configuring the area of the red-color sub-pixel R to be greater than the area of the blue-color sub-pixel B, the transmittance of light rays can also be effectively increased.

Figure 3:
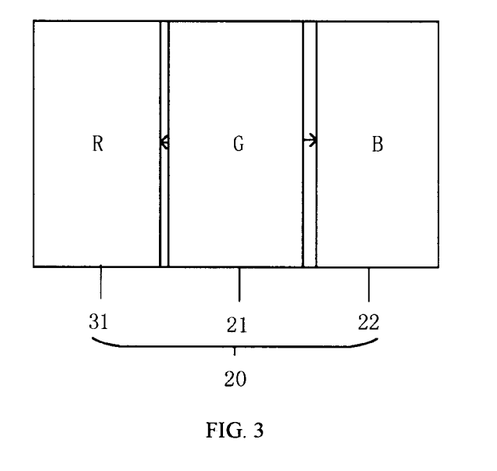
FIG. 3 schematically shows a schematic structural diagram of the sub-pixels in another liquid-crystal display panel.

In another alternative implementation, referring to FIG. 3, the plurality of sub-pixels 20 may further include a third-color sub-pixel 31, the transmittance of the third-color sub-pixel 31 is greater than the transmittance of the second-color sub-pixel 22, and less than the transmittance of the first-color sub-pixel 21, and the area of the third-color sub-pixel 31 is greater than or equal to the area of the second-color sub-pixel 22, and less than or equal to the area of the first-color sub-pixel 21.

Optionally, as shown in FIG. 3, the emitted-light color of the first-color sub-pixel 21 is green, the emitted-light color of the second-color sub-pixel 22 is blue, and the emitted-light color of the third-color sub-pixel 31 is red. In other words, the first-color sub-pixel 21 is a green-color sub-pixel G, the second-color sub-pixel 22 is a blue-color sub-pixel B, and the third-color sub-pixel 31 is a red-color sub-pixel R.

The dotted lines in FIG. 3 are the boundary lines when the area ratio of the green-color sub-pixel G, the blue-color sub-pixel B and the red-color sub-pixel R is 1:1:1.

In the present implementation, based on the area ratio of 1:1:1, by increasing the area of the green-color sub-pixel G, and reducing the area of the blue-color sub-pixel B, the area of the green-color sub-pixel G is greater than the area of the blue-color sub-pixel B, to increase the transmittance of light rays.

In the present implementation, the area of the red-color sub-pixel R may be maintained constant. Alternatively, the area of the red-color sub-pixel R may be increased, wherein the proportion of increasing does not exceed the green-color sub-pixel G, whereby the area of the red-color sub-pixel R is less than or equal to the area of the green-color sub-pixel G. Alternatively, the area of the red-color sub-pixel R may also be reduced, as shown in FIG. 3, wherein the proportion of reduction does not exceed the blue-color sub-pixel B, whereby the area of the red-color sub-pixel R is greater than or equal to the area of the blue-color sub-pixel B.

The present implementation, by increasing the area of the sub-pixel of a higher color-resistance transmittance, and reducing the area of the sub-pixel of a lower color-resistance transmittance, may effectively increase the transmittance of the liquid-crystal display panel.

Figure 4:
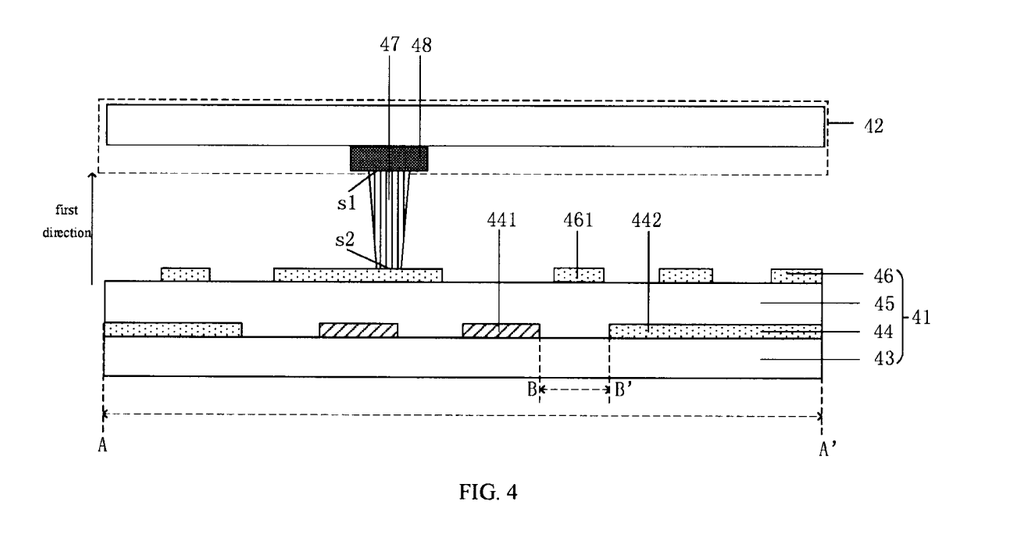
FIG. 4 schematically shows a schematic sectional structural diagram of a liquid-crystal display panel.
Figure 5:
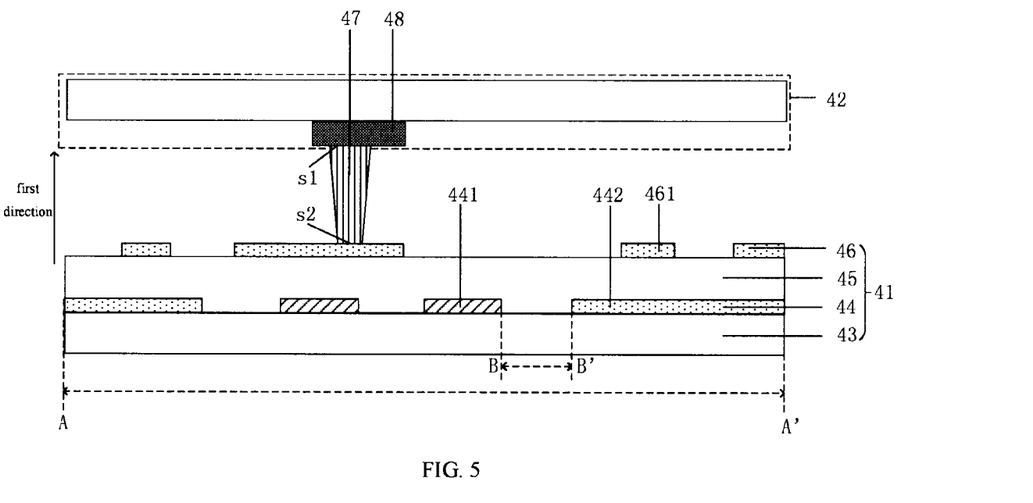
FIG. 5 schematically shows a schematic sectional structural diagram of another liquid-crystal display panel.

In an alternative implementation, referring to FIGS. 4 and 5, the liquid-crystal display panel includes an array base plate 41 and a cell substrate 42 that face each other. The array base plate 41 and the cell substrate 42 may be cell-assembled together by using a frame sealing adhesive, thereby restricting the liquid crystal within the area enclosed by the frame sealing adhesive. The array base plate 41 may include a first substrate 43, and a first electrode layer 44, an insulating layer 45 and a second electrode layer 46 that are provided in stack on the side of the first substrate 43 that is close to the cell substrate 42.

The first electrode layer 44 includes a touch-controlling electrode 441 and a pixel electrode 442 that are separately provided, the second electrode layer 46 includes a common electrode 461, and the touch-controlling electrode 441 and the common electrode 461 are connected to the same voltage outputting terminal.

The touch-controlling electrode 441 and the pixel electrode 442 are located in the same layer and are insulated from each other, and the materials of them may be the same or different. The touch-controlling electrode 441 is used to transmit a touch-controlling signal, and the pixel electrode 442 is used to transmit a displaying signal.

The touch-controlling electrode 441 and the common electrode 461 may be individually connected to a common-voltage outputting terminal. The pixel electrode 442 may be connected to the drain of a thin-film transistor in the sub-pixels 20.

A liquid crystal is filled between the array base plate 41 and the cell substrate 42, and the pixel electrode 442 and the common electrode 461 or the touch-controlling electrode 441 may form therebetween a horizontal electric field for driving the liquid crystal to deflect.

As shown in FIG. 4, a separating region BB' exists between the touch-controlling electrode 441 and the pixel electrode 442. The inventor has found that, when the orthographic projections of the common electrode 461 and the separating region BB' on the first substrate 43 overlap, the common electrode 461 at that position shields the horizontal electric field formed between the pixel electrode 442 and the touch-controlling electrode 441, which results in an insufficient driving force for the deflection of the liquid-crystal molecules, whereby resulting in the decreasing of the transmittance.

In order to solve the above problem, as shown in FIG. 5, the orthographic projection of the second electrode layer 46 on the first substrate 43 and the orthographic projection on the first substrate 43 of the separating region BB' between the touch-controlling electrode 441 and the pixel electrode 442 do not overlap. Accordingly, at the position corresponding to the separating region BB', the pixel electrode 442 and the touch-controlling electrode 441 may form an effective horizontal electric field therebetween, to increase the driving force for the deflection of the liquid-crystal molecules, thereby increasing the transmittance of light rays.

Figure 6:
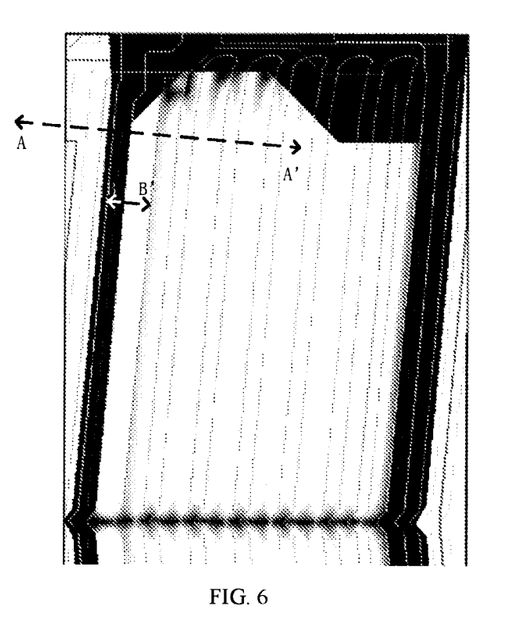
FIG. 6 schematically shows a schematic planar structural diagram of the array base plate in a liquid-crystal display panel.
Figure 7:
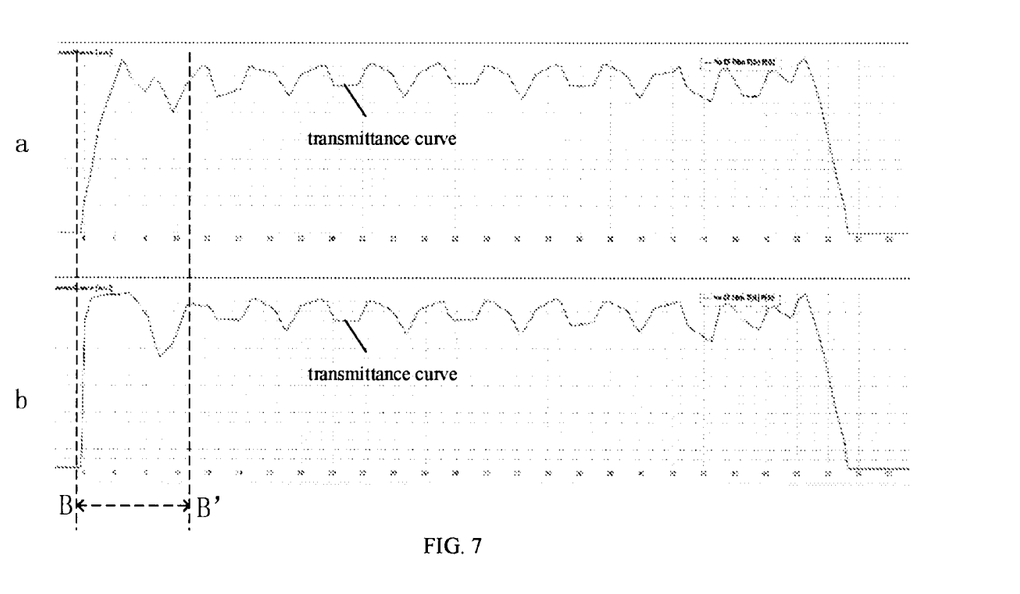
FIG. 7 schematically shows a result of simulation of the transmittances of two liquid-crystal display panels.

The position of the sectional view shown in FIG. 5 on the array base plate is shown in FIG. 6. Plan a in FIG. 7 shows a result of simulation of the transmittance of the structure shown in FIG. 4, and plan b in FIG. 7 shows a result of simulation of the transmittance of the structure shown in FIG. 5. As compared with the structure shown in FIG. 4, the transmittance of the structure shown in FIG. 5 within the separating region BB' is obviously increased.

Figure 8:
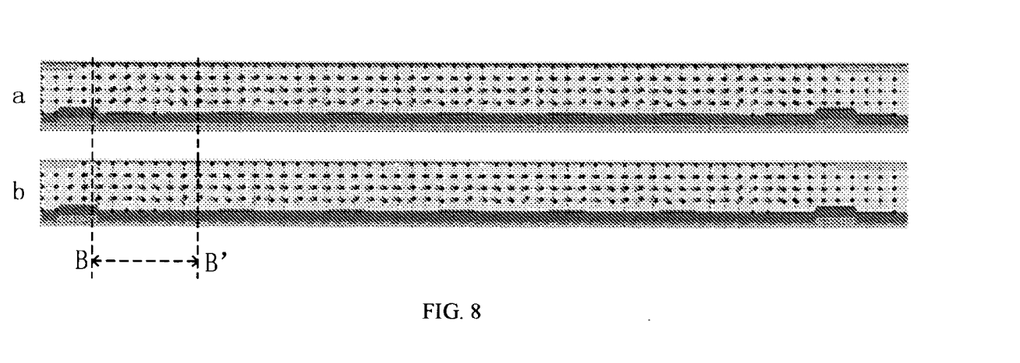
FIG. 8 schematically shows a result of simulation of the liquid-crystal deflections of two liquid-crystal display panels.

Plan a in FIG. 8 shows a result of simulation of the liquid-crystal deflection of the structure shown in FIG. 4, and plan b in FIG. 8 shows a result of simulation of the liquid-crystal deflection of the structure shown in FIG. 5. As compared with the structure shown in FIG. 4, the deflection angle of the liquid-crystal molecules of the structure shown in FIG. 5 within the separating region BB' is larger, and therefore the transmittance of light rays is higher.

Additionally, as shown in FIGS. 4 and 5, the orthographic projection of the second electrode layer 46 on the first substrate 43 and the orthographic projection of the touch-controlling electrode 441 on the first substrate 43 do not overlap. That may prevent the second electrode layer 46 from shielding the touch-controlling signal in the touch-controlling electrode 441, to increase the touch-controlling sensitivity.

By using the technical solution according to the present implementation, in the case in which each of the sub-pixels is provided with one touch-controlling electrode 441, the transmittance may be increased by 5%-8%, and in the case in which the three sub-pixels share one touch-controlling electrode 441, the transmittance may be increased by 2%-4%.

In an alternative implementation, as shown in FIGS. 4 and 5, the liquid-crystal display panel includes an array base plate 41 and a cell substrate 42 that face each other, an isolating pillar 47 is provided between the array base plate 41 and the cell substrate 42, and in the direction from the array base plate 41 pointing to the cell substrate 42, i.e., in the first direction shown in the figures, the isolating pillar 47 has a first surface s1 and a second surface s2 that are opposite.

The isolating pillar 47 is used to support the space between the array base plate 41 and the cell substrate 42, to maintain the evenness and the stability of the thickness of the liquid-crystal cell.

The isolating pillar 47 may be provided on the array base plate 41, in which case the first surface s1 is the surface of the side close to the array base plate 41, and the second surface s2 is the surface of the side away from the array base plate 41. The isolating pillar 47 may also be provided on the cell substrate 42, as shown in FIGS. 4 and 5, in which case the first surface s1 is the surface of the side away from the array base plate 41, and the second surface s2 is the surface of the side close to the array base plate 41.

Figure 9:
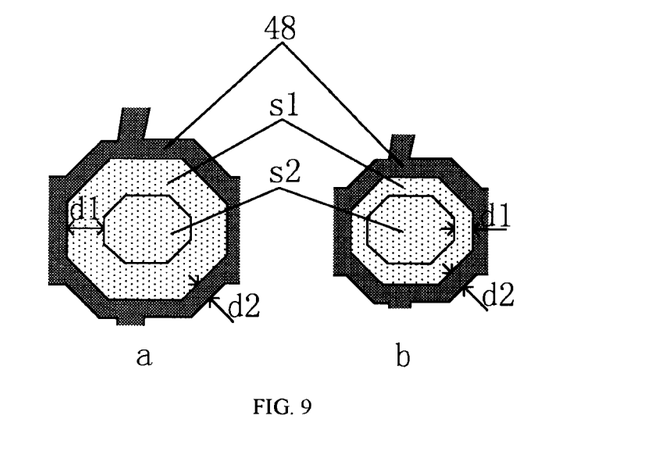
FIG. 9 schematically shows a schematic planar structural diagram of an isolating pillar and a light shielding layer.

As shown in plan a in FIG. 9, the edges of the first surface s1 protrude relatively to the edges of the orthographic projection of the second surface s2 on the first surface s1, and the protruding amount d1 may be greater than 3 μm or 4 μm, and less than or equal to 5 μm.

Optionally, as shown in plan b in FIG. 9, the edges of the first surface s1 protrude relatively to the edges of the orthographic projection of the second surface s2 on the first surface s1, and the protruding amount d1 may be less than or equal to 3 μm.

Because the liquid-crystal molecules close to the isolating pillar 47 are arranged chaotically, light leakage happens. In a particular implementation, as shown in FIGS. 4 and 5, a light shielding layer 48 may be provided at the light-leakage position of the liquid-crystal display panel, to ensure the frame quality.

As shown in plan b in FIG. 9, by reducing the protruding amount d1 of the edges of the first surface s1 relative to the edges of the second surface s2, the area covered by the light shielding layer 48 may be reduced without losing the contact area (i.e., the area of the second surface s2), to increase the aperture ratio, thereby increasing the transmittance of the liquid-crystal display panel. Regarding a product whose pixel density is 250 pixels/inch, by using the structure of the isolating pillar 47 according to the present implementation, the transmittance may be increased by 2%-4%.

In a particular implementation, the light shielding layer 48 may be provided on the array base plate 41 and/or the cell substrate 42. In other words, the light shielding layer 48 may be provided on the array base plate 41, or provided on the cell substrate 42 (as shown in FIGS. 4 and 5), or partially provided on the array base plate 41, and partially provided on the cell substrate 42.

The edges of the orthographic projection of the light shielding layer 48 on the plane where the first surface s1 is located protrude relatively to the edges of the first surface s1, and the protruding amount d2 may be greater than or equal to 2 µm, and less than or equal to 10 µm. For example, the protruding amount d2 may be 3 µm, 4 µm, 5 µm and so on. By providing the light shielding layer 48 to completely cover the isolating pillar 47, the effect of blocking light leakage is reached.

It should be noted that the above-described protruding amount of one edge relative to another edge refers to the distance between the two edges.

The liquid-crystal display panel according to the present disclosure, while not increasing the quantity of the mask and the process difficulty, may enable the transmittance of the first region to reach 15%, to reduce the loss in the color gamut caused by the reducing of the thickness of the color-resistance layer, which may satisfy both of the demands on the imaging and on the displaying of the region of the under-screen camera.

Figure 10:
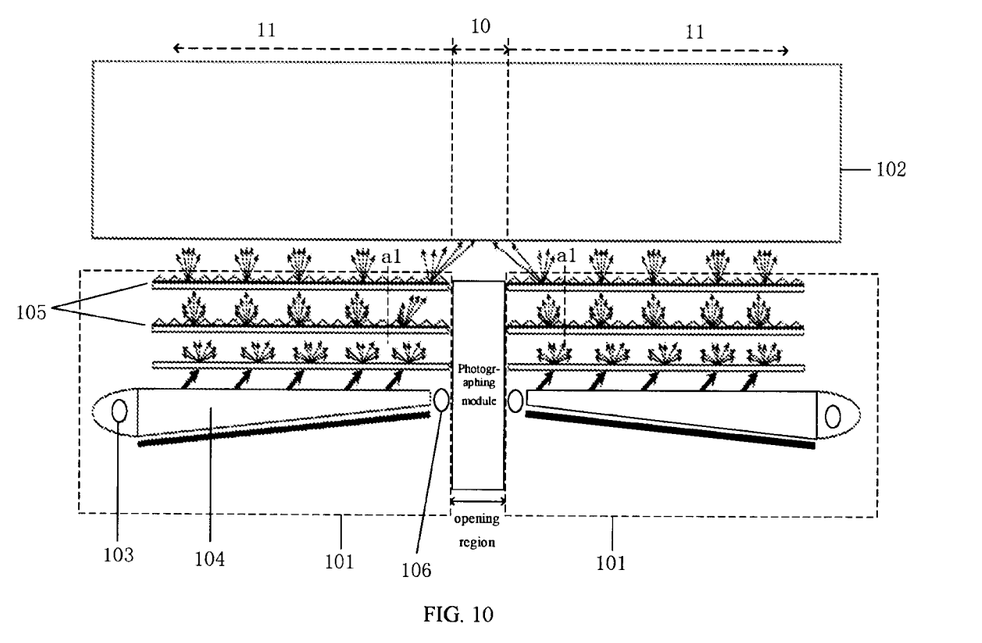
FIG. 10 schematically shows a schematic sectional structural diagram of a displaying module.

The present disclosure further provides a displaying module. as shown in FIG. 10, the displaying module includes a backlight module 101 and the liquid-crystal display panel 102 according to any one of the above embodiments, the backlight module 101 is provided away from the light exiting side of the liquid-crystal display panel 102, and the backlight module 101 is for providing a backlight to the liquid-crystal display panel 102.

The backlight module 101 has an opening region, the orthographic projection of the opening region on the display panel is located within the first region 10, the opening region is for placing a photographing module such as a camera, and the photographing module is for photographing an image.

A person skilled in the art can understand that the displaying module has the advantages of the liquid-crystal display panel 102 described above.

The backlight module 101 may provide a backlight to the second region 11 of the liquid-crystal display panel 102, and may also provide a backlight to the first region 10.

In the liquid-crystal display panel 102, because the color-resistance layer of the sub-pixels 20 located within the first region 10 has a lower thickness, the first region 10 has a lower color gamut. For example, the National Television Standards Committee (NTSC) color gamut of the second region 11 is 70%, and the NTSC color gamut of the first region 10 might be merely 45%.

As shown in FIG. 10, the backlight module 101 may include a first light source 103, and the first light source 103 may, for example, be a light emitting diode (LED).

In a particular implementation, the backlight module 101 may further include a light guide plate 104. The backlight module 101 may be of a side-entering type. Correspondingly, the first light source 103 may be located at the end face of the light guide plate 104 in the thickness direction. As shown in FIG. 10, the first light source 103 is located at the end face of the side of the light guide plate 104 that is away from the opening region. The backlight module 101 may also be of a direct type. Correspondingly, the first light source 103 may be located on the surface of the side of the light guide plate 104 that is away from the liquid-crystal display panel. The particular position of the first light source in the backlight module is not limited in the present disclosure.

Optionally, the first light source 103 may be a light emitting diode using a red-green-color phosphor powder.

In order to enable the first light source 103 to generate a white light, a blue-light LED chip may be used, for example.

By exciting phosphor powders of different colors by using the blue light generated by the blue-light LED chip, the effect of a white light may be reached. The commonly used phosphor powders include a yellow-color phosphor powder, a yellow-red-color phosphor powder, a red-green-color phosphor powder, a potassium-fluosilicate phosphor powder and so on.

By using the red-green-color phosphor powder, the thickness of the color-resistance layer may be reduced suitably, which cannot only satisfy the demand on high-color-gamut products, but can also increase the transmittance by approximately 40%. Because the present solution can increase the utilization ratio of the backlight, in some products of a high brightness and a low power consumption, an APF polarizer is not required to be provided, which may reduce the cost.

Optionally, as shown in FIG. 10, the backlight module 101 may further include at least one prismatic lens 105, and the at least one prismatic lens 105 is located on the light exiting side of the light guide plate 104. The light exiting side of the light guide plate 104 refers to the side of the light guide plate 104 that is close to the liquid-crystal display panel 102.

Figure 11:
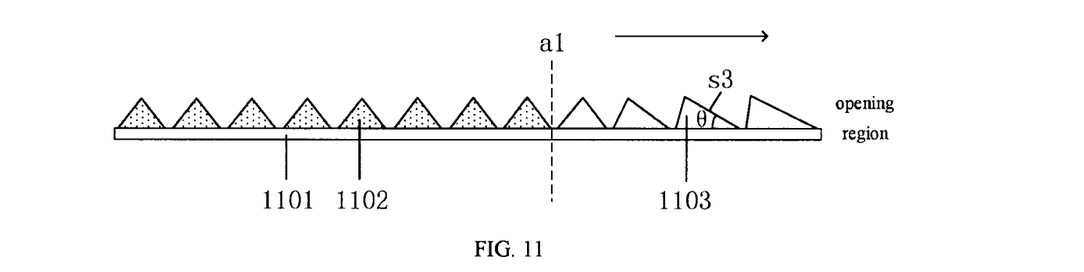
FIG. 11 schematically shows a schematic sectional structural diagram of a prismatic lens.

Optionally, referring to FIG. 11, FIG. 11 shows a schematic sectional structural diagram of a prismatic lens. As shown in FIG. 11, the prismatic lens 105 may include a base film 1101, and a plurality of prism components provided on the side of the base film 1101 that is away from the light guide plate 104, the plurality of prism components include at least one first prism component 1102 and at least one second prism component 1103, the at least one second prism component 1103 is located between the at least one first prism component 1102 and the opening region, the first prism component 1102 is for exiting light rays entering the first prism component 1102 toward the second region 11, and the second prism component 1103 is for exiting at least part of light rays entering the second prism component 1103 toward the first region 10.

As shown in FIGS. 10 and 11, in the prismatic lens 105, the first prism component 1102 and the second prism component 1103 are triangular protrusions close to one side of the liquid-crystal display panel 102, which is not limited in the present disclosure.

As shown in FIGS. 10 and 11, the first prism component 1102 is located on the side of the demarcation line a1 that is further from the opening region, and the incident light rays that are originally divergent in various directions, after passing through the first prism component 1102, enter the second region 11 of the liquid-crystal display panel 102 at lower divergence angles, to reach the effect of increasing the axial brightness.

As shown in FIGS. 10 and 11, the second prism component 1103 is located on the side of the demarcation line a1 that is close to the opening region. After the incident light rays that are originally divergent in various directions have passed through the second prism component 1103, part or all of the light rays obliquely enter the first region 10 of the liquid-crystal display panel 102, thereby providing a backlight to the first region 10 of the liquid-crystal display panel 102.

In the present implementation, by configuring the prism components in the prismatic lens 105 to be different, the prism component close to the opening region may deflect the incident light rays to the direction emitting toward the first region, thereby increasing the brightness of the first region 10.

Optionally, as shown in FIG. 11, each of the prism components has a bevel s3 close to the opening region, and the included angle between the bevel s3 and the base film 1101 is an angle of gradient θ. The angle of gradient θ of a second prism component 1103 further from the opening region may be greater than the angle of gradient θ of a second prism component 1103 close to the opening region, and less than the angle of gradient θ of the first prism component 1102.

In other words, the angle of gradient θ of the second prism component 1103 is less than the angle of gradient θ of the first prism component 1102. Furthermore, in the direction close to the opening region (for example, the direction of the arrow in FIG. 11), the angles of gradient θ of the second prism components 1103 gradually decrease.

Optionally, the angles of gradient θ of all of the first prism components 1102 are equal. For example, all of the angles of gradient θ of the first prism components 1102 are 45°. In such a case, all of the angles of gradient θ of the second prism components 1103 are less than 45°.

Figure 12:
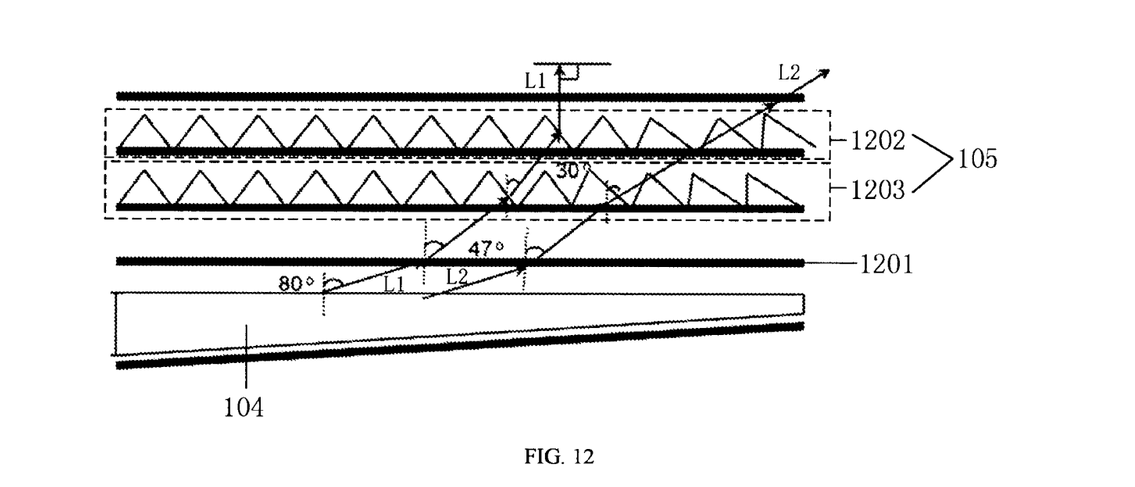
FIG. 12 schematically shows a schematic sectional structural diagram of a backlight module.

Referring to FIG. 12, FIG. 12 shows the propagation paths of a first light ray L1 and a second light ray L2. As shown in FIG. 12, the backlight module 101 may further include a diffuser 1201 located between the light guide plate 104 and the prismatic lenses 105, and the backlight module 101 includes two prismatic lenses 105, which are an upper prismatic lens 1202 and a lower prismatic lens 1203, wherein the lower prismatic lens 1203 is located on the side of the upper prismatic lens 1202 that is close to the light guide plate 104. The structures of the upper prismatic lens 1202 and the lower prismatic lens 1203 may be the same or different, which is not limited in the present disclosure.

The first light ray L1 and the second light ray L2 exit from the light-exiting face of the light guide plate 104 at the same angle. The first light ray L1 sequentially passes through the diffuser 1201, the first prism component 1102 of the lower prismatic lens 1203, and the first prism component 1102 of the upper prismatic lens 1202, and finally the first light ray L1 enters the second region 11 of the liquid-crystal display panel 102 in the normal direction. The second light ray L2 sequentially passes through the diffuser 1201, the second prism component 1103 of the lower prismatic lens 1203 and the second prism component 1103 of the upper prismatic lens 1202, and finally the second light ray L2 obliquely enters the first region 10 of the liquid-crystal display panel 102.

Optionally, as shown in FIG. 10, the backlight module 101 may further include a second light source 106.

The second light source 106 may, for example, be a light emitting diode. In a particular implementation, a plurality of LED lights or Mini LED lights may be provided at the periphery of the opening region, and the particular quantity may be determined according to the size of the opening region.

Particularly, the second light source 106 may be located at the end face of the side of the light guide plate 104 that is close to the opening region. The position of the second light source 106 corresponds to the second prism component 1103, thereby increasing the backlight brightness of that region, whereby the light attenuation caused by the second prism component 1103 deflecting the incident light rays to the first region 10 is compensated, to improve the uniformity of the backlight brightness.

Optionally, the second light source 106 may be a light emitting diode using a red-green-color phosphor powder. In a particular implementation, the second light source 106 and the first light source 103 may be the same or different. When both of the second light source 106 and the first light source 103 are a light emitting diode using a red-green-color phosphor powder, the color gamut of the displayed frame can be increased.

The present disclosure further provides an electronic device, wherein the electronic device includes a photographing module and the displaying module according to any one of the above embodiments, and the photographing module is located within the opening region of the backlight module.

A person skilled in the art can understand that the electronic device has the advantages of the liquid-crystal display panel described above.

It should be noted that the electronic device according to the present embodiment may be any products or components that have the function of 2D or 3D displaying, such as an electronic paper, a mobile phone, a tablet personal computer, a TV set, a notebook computer, a digital photo frame and a navigator.

The embodiments of the description are described in the mode of progression, each of the embodiments emphatically describes the differences from the other embodiments, and the same or similar parts of the embodiments may refer to each other.

Finally, it should also be noted that, in the present text, relation terms such as first and second are merely intended to distinguish one entity or operation from another entity or operation, and that does not necessarily require or imply that those entities or operations have therebetween any such actual relation or order. Furthermore, the terms "include", "comprise" or any variants thereof are intended to cover non-exclusive inclusions, so that processes, methods, articles or devices that include a series of elements do not only include those elements, but also include other elements that are not explicitly listed, or include the elements that are inherent to such processes, methods, articles or devices. Unless further limitation is set forth, an element defined by the wording "comprising a . . . " does not exclude additional same element in the process, method, article or device comprising the element.

The liquid-crystal display panel, the displaying module and the electronic device according to the present disclosure have been described in detail above. The principle and the embodiments of the present disclosure are described herein with reference to the particular examples, and the description of the above embodiments is merely intended to facilitate to understand the method according to the present disclosure and its core concept. Moreover, for a person skilled in the art, according to the concept of the present disclosure, the particular embodiments and the range of application may be varied. In conclusion, the contents of the description should not be understood as limiting the present disclosure.

A person skilled in the art, after considering the description and implementing the invention disclosed herein, will readily envisage other embodiments of the present disclosure. The present disclosure aims at encompassing any variations, uses or adaptative alternations of the present disclosure, wherein those variations, uses or adaptative alternations follow the general principle of the present disclosure and include common knowledge or common technical means in the art that are not disclosed by the present disclosure. The description and the embodiments are merely deemed as exemplary, and the true scope and spirit of the present disclosure are presented by the following claims.

It should be understood that the present disclosure is not limited to the accurate structure that has been described above and shown in the drawings, and may have various modifications and variations without departing from its scope. The scope of the present disclosure is merely limited by the appended claims.

The "one embodiment", "an embodiment" or "one or more embodiments" as used herein means that particular features, structures or characteristics described with reference to an embodiment are included in at least one embodiment of the present disclosure. Moreover, it should be noted that here an example using the wording "in an embodiment" does not necessarily refer to the same embodiment.

The description provided herein describes many concrete details. However, it can be understood that the embodiments of the present disclosure may be implemented without those concrete details. In some of the embodiments, well-known processes, structures and techniques are not described in detail, so as not to affect the understanding of the description.

In the claims, any reference signs between parentheses should not be construed as limiting the claims. The word "comprise" does not exclude elements or steps that are not listed in the claims. The word "a" or "an" preceding an element does not exclude the existing of a plurality of such elements. The present disclosure may be implemented by means of hardware comprising several different elements and by means of a properly programmed computer. In unit claims that list several devices, some of those devices may be embodied by the same item of hardware. The words first, second, third and so on do not denote any order. Those words may be interpreted as names.

Finally, it should be noted that the above embodiments are merely intended to explain the technical solutions of the present disclosure, and not to limit them. Although the present disclosure is explained in detail with reference to the above embodiments, a person skilled in the art should understand that he can still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present disclosure.

The invention claimed is:

1. A liquid-crystal display panel, wherein the liquid-crystal display panel comprises a first region and a second region, and a transmittance of the first region is greater than a transmittance of the second region;
    the liquid-crystal display panel comprises a plurality of sub-pixels;
    the plurality of sub-pixels include a first-color sub-pixel and a second-color sub-pixel, a transmittance of the first-color sub-pixel is greater than a transmittance of the second-color sub-pixel, and an area of the first-color sub-pixel is greater than an area of the second-color sub-pixel; and
    the plurality of sub-pixels further include a first-region sub-pixel and a second-region sub-pixel that have a same color, the first-region sub-pixel is located within the first region, the second-region sub-pixel is located within the second region, and a thickness of a color-resistance layer of the first-region sub-pixel is less than or equal to a thickness of a color-resistance layer of the second-region sub-pixel;
    wherein the plurality of sub-pixels further comprise a third-color sub-pixel, a transmittance of the third-color sub-pixel is greater than the transmittance of the second-color sub-pixel, and less than the transmittance of the first-color sub-pixel, and an area of the third-color sub-pixel is greater than or equal to the area of the second-color sub-pixel, and less than or equal to the area of the first-color sub-pixel.

2. The liquid-crystal display panel according to claim 1, wherein an emitted-light color of the first-color sub-pixel is green, and an emitted-light color of the second-color sub-pixel is red or blue.

3. The liquid-crystal display panel according to claim 1, wherein an emitted-light color of the first-color sub-pixel is green, an emitted-light color of the second-color sub-pixel is blue, and an emitted-light color of the third-color sub-pixel is red.

4. The liquid-crystal display panel according to claim 1, wherein the liquid-crystal display panel comprises an array base plate and a cell substrate that face each other, and the array base plate comprises a first substrate, and a first electrode layer, an insulating layer and a second electrode layer that are provided in stack on one side of the first substrate that is close to the cell substrate;
    the first electrode layer comprises a touch-controlling electrode and a pixel electrode that are separately provided, the second electrode layer comprises a common electrode, and the touch-controlling electrode and the common electrode are connected to a same voltage outputting terminal; and
    an orthographic projection of the second electrode layer on the first substrate and an orthographic projection of the touch-controlling electrode on the first substrate do not overlap, and the orthographic projection of the second electrode layer on the first substrate and an orthographic projection on the first substrate of a separating region between the touch-controlling electrode and the pixel electrode do not overlap.

5. The liquid-crystal display panel according to claim 1, wherein the liquid-crystal display panel comprises an array base plate and a cell substrate that face each other, an isolating pillar is provided between the array base plate and the cell substrate, and in a direction from the array base plate pointing to the cell substrate, the isolating pillar is provided with a first surface and a second surface that are opposite; and
    edges of the first surface protrude relatively to edges of an orthographic projection of the second surface on the first surface, and a protruding amount is less than or equal to 3 μm.

6. The liquid-crystal display panel according to claim 5, wherein the liquid-crystal display panel further comprises a light shielding layer, the light shielding layer is provided on the array base plate and/or the cell substrate, edges of an orthographic projection of the light shielding layer on a plane where the first surface is located protrude relatively to the edges of the first surface, and a protruding amount is greater than or equal to 2 μm, and less than or equal to 10 μm.

7. A displaying module, wherein the displaying module comprises a backlight module and the liquid-crystal display panel according to claim 1, the backlight module is provided away from a light exiting side of the liquid-crystal display panel, and the backlight module is for providing a backlight to the liquid-crystal display panel; and
    the backlight module is provided with an opening region, an orthographic projection of the opening region on the display panel is located within the first region, the opening region is for placing a photographing module, and the photographing module is for photographing an image.

8. The displaying module according to claim 7, wherein the backlight module comprises a first light source, and the first light source is a light emitting diode using a red-green-color phosphor powder.

9. The displaying module according to claim 7, wherein the backlight module comprises a light guide plate and at least one prismatic lens, and the at least one prismatic lens is located on a light exiting side of the light guide plate; and
the prismatic lens comprises a base film, and a plurality of prism components provided on one side of the base film away from the light guide plate, the plurality of prism components include at least one first prism component and at least one second prism component, the at least one second prism component is located between the at least one first prism component and the opening region, the first prism component is for exiting light rays entering the first prism component toward the second region, and the second prism component is for exiting at least part of light rays entering the second prism component toward the first region.

10. The displaying module according to claim 9, wherein each of the prism components is provided with a bevel close to the opening region, and an included angle between the bevel and the base film is an angle of gradient; and
an angle of gradient of a second prism component away from the opening region is greater than an angle of gradient of a second prism component close to the opening region, and less than an angle of gradient of the first prism component.

11. The displaying module according to claim 10, wherein angles of gradient of all of the first prism components are equal.

12. The displaying module according to claim 11, wherein the angles of gradient of the first prism components are 45°.

13. The displaying module according to claim 9, wherein the backlight module further comprises a second light source, and the second light source is located at an end face of one side of the light guide plate that is close to the opening region.

14. The displaying module according to claim 13, wherein the second light source is a light emitting diode using a red-green-color phosphor powder.

15. An electronic device, wherein the electronic device comprises a photographing module and the displaying module according to claim 7, and the photographing module is located within the opening region of the backlight module.

* * * * *